Figure 3:
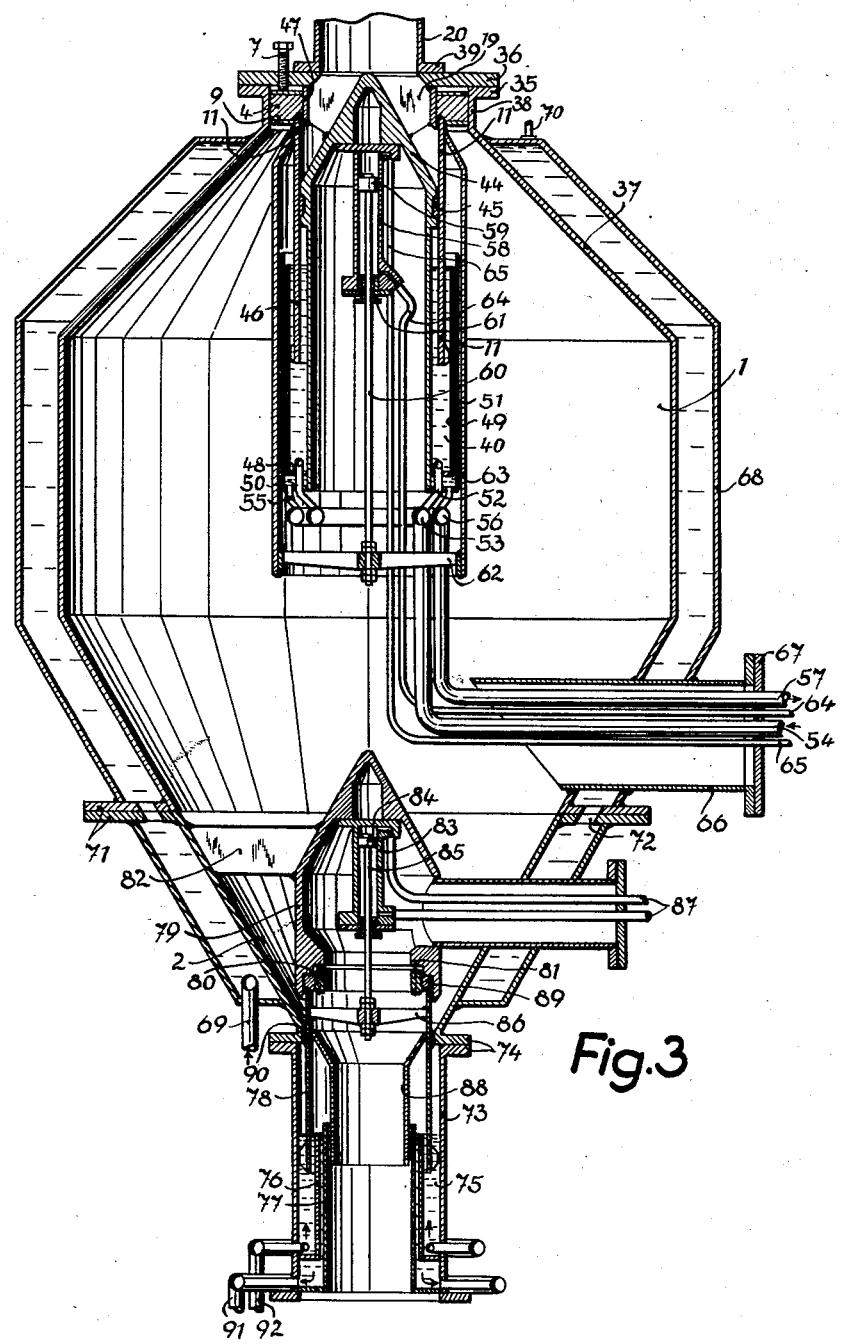

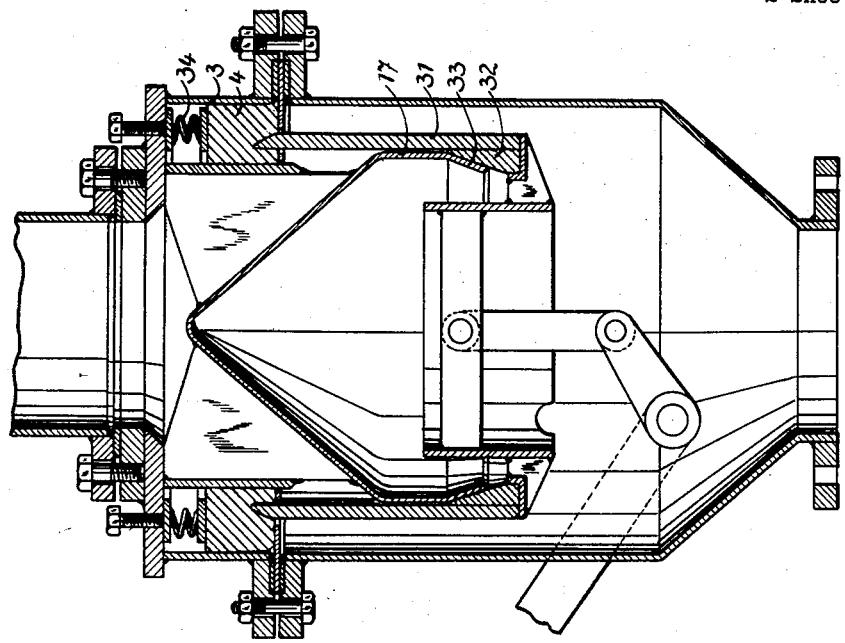

United States Patent Office 2,852,035
Patented Sept. 16, 1958

2,852,035

SEALING DEVICE, IN PARTICULAR FOR THE TRANSFER OF LOOSE MATERIAL INTO OR OUT OF GAS-FILLED SPACES

Ferdinand Holle, Essen, Germany; Franziska Holle, nee Suerth, sole heir of said Ferdinand Holle, assignor, by mesne assignments, to Koppers Company, Inc., Pittsburgh, Pa., a corporation of Delaware Application September 4, 1953, Serial No. 378,497

10 Claims. (Cl. 137—219)

The invention relates to sealing devices in particular for the transfer of loose solid material into or out of gas-filled spaces, for example gasification chambers.

Material in the solid state which is to be treated in reaction spaces has in the past been transferred into or out of the reaction space by pushers or cone-shaped sealing devices. When the material has to be moved at short intervals of time, continuous operation of the sealing device is required, so that this is subjected to great wear at the sealing surfaces. In addition there is the further disadvantage that dust easily settles between the sealing surfaces, especially when it is a case of handling material in finely-ground or dust form, so that even after quite a short operating period there is no longer a gas-tight seal.

The invention solves the problem of constructing sealing devices, in particular for the transfer of finely-ground or dust material into a gas-filled space, in such a way that even with a certain amount of wear a gas-tight seal is still ensured in parts lying in the region of the material.

The object of the invention is further to continue the sealing by means of closing cylinder or sleeve longitudinally displaceable in a cup filled with liquid. With a suitable height of the liquid cup, such a sealing device is able to seal gas-filled spaces at high pressure in a gas-tight manner.

The sealing device according to the invention consists substantially of a preferably tubular housing combined with the device to be sealed off and having a ring channel filled with packing and a closing sleeve forming a gas-tight closure with this channel and longitudinally displaceable axially against a sealing surface of the packing lying outside the region of the material flow, and means whereby the sleeve is kept under pressure in the sealing position. Between this sealing cylinder or sleeve and another part of the housing of the sealing device is a space sufficiently large for the through flow of the medium which is to be shut off.

With such a device, constructed according to the invention, the sealing seating surface in a ring channel can not be spoiled by wear or friction of the material during flow since it is out of the region of flow of the material through the housing. The sealing material consists preferably of a soft material into which the sleeve terminus preferably sharpened like a knife edge, of the closing sleeve can press, so that a gas-tight seal is obtained even if dust sticks to the sealing surfaces of the packing in the ring channel.

According to the invention the packing material of the ring channel in the housing is arranged in the channel so as to be easily replaced.

According to a further characteristic of the invention the axially movable closing sleeve or cylinder consists of two axially adjustable telescopic parts between which, in the region of an inner annular bearing for the sleeve there is arranged another sealing ring which is pressable against the wall of the sleeve bearing under the action of the closing pressure.

In order to obtain, with high pressures in a gas-filled space, a gas-tight seating of the closing sleeve against its sealing surface in the ring channel without the application of great force by hand, the invention further provides for closing the cylinder or sleeve with a pneumatic or hydraulic-operated pressure piston device.

A further object of the invention is to provide both the inlet and also the outlet end of the sealing housing with similar seals. Thereby it is possible to practically exclude or to reduce to a minimum any loss of gas from spaces at a high gas pressure.

Finally the invention further consists in surrounding the housing of the sealing device with a liquid-cooled double jacket. Such a cooling of the sealing device is of advantage for example in conjunction with a gasification plant from which the hot gasification residue is removed, since in consequence successive actuations of the two closing cylinders with hot material the hot material remains therein for a short time in the sealing device and the cooling jacket thus prevents overheating of the sealing means.

In this way the same closing pressure, produced for example by a lever weight or by the action of a pressure spring, both presses the closing sleeve or cylinder against the packing in the ring channel and also presses the packing lying in the region of the ring channel connected with the housing tightly against the wall of the ring channel, so that the packing material, consisting of a soft material, can always come up tight again against the ring channel even after wear of the packing which may in the course of time result.

The invention is shown diagrammatically in vertical section in Figs. 1–3, and in preferred embodiment thereof.

The sealing device consists of a tubular housing 1 which, when it is to be used for feeding material into a gas-filled space, is connected to the latter from below at 2. The tubular housing 1 is connected at its top to a housing top 3, consisting of a double-wall jacket, of only small height, which is in the form of a ring channel surrounding a sealing mass 4, for example asbestos. The two housings 1, 3 are connected together gas-tight by bolt screws 5. The housing top 3 is provided above with a flat ring 6, through which screws 7 pass at intervals. The screws 7 press, through a flat ring 8, on the sealing ring mass 4, which is held below by a flat ring 9 clamped between the flanges of the housings 1, 3. The flat ring 9 extends only so far that at 10 the sealing ring mass 4 remains free to be engaged by a closing sleeve or cylinder 11.

The closing cylinder sleeve 11 is formed in two telescopic parts 11, 12 connected together for axial adjustment in a longitudinally displaceable manner. As is seen from Fig. 1, the lower outer part 12 of the closing cylinder engages by an upper recessed portion shaped part 13 over the lower portion of the upper part 11, which part 11 has preferably at two diametrically opposite points, longitudinal grooves 14 each with a screw 15 which passes through the upper portion 13 of the lower outer part 12, so that the two closing parts 11, 12 can not rotatively move against one another. Between the upper inner part 11 and the lower outer part 12 there is arranged a sealing ring 16 of soft material, for example asbestos, which lies against the exterior wall of an inner tubular cap 17 which constitutes a bearing for the sleeve 11. The tubular cap 17 is drawn out above conically to form a closed head and is fixed, for example by welding, to the inner jacket wall 18 of the upper housing 3 by vane corrugations 19. A filling pipe 20 for feeding in the material from an exterior is combined with the cover 6 of the upper housing part 3 for example by bolt screws 21.

The lower outer closing cylinder or sleeve part 12 is combined with a piece of piston skirt pipe 22 which projects freely into the interior of cap 17. On the piston skirt pipe 22 there is pivoted at 23 a lever 25 through a bracket 24 fixed to the skirt pipe 22. The lever 25 is pivoted to a further lever 26 on shaft 27 which passes gas-tightly through the wall of the housing 1 is at 27. The joint shaft 27 is connected with a weight-loaded lever 28 whereby the closing or sealing cylinder parts 11, 12 are pressed against the sealing ring channel mass 4 in the closed position of the sealing device. Thus in this closed position also the lower outer closing cylinder part 12 presses against the sealing ring mass 16, so that the latter is pressed against the exterior wall of the cap 17 under the action of the conical surfaces 29. By moving the lever 28 over the lower outer telescopic part 12 is drawn downwards, as shown by dash and dot line in Fig. 1, and by means of the sliding screw 15 takes the upper part 11 with it, so that sealing is no longer present. Thereby the material fed in through the filling pipe 20 can pass into the annular space 30 formed between the housing 1 and the parts 11, 12 and be fed out at 2.

One or more pressure springs can also be arranged in the housing, between either the housing 1 or the cap 17 fixed to it by vanes 19 and the lower part 12, and a continuous pressure will thus be exerted against the closing parts 16, 12. In such a case the lever 28 would not be weight-loaded and would merely have the task of sinking the closing parts 11, 12 against the action of the springs during the short period of the filling or emptying process.

The sealing pressure can also be brought about by a hydraulic pressure device.

With the constructional form shown in Fig. 2 the closing sleeve or cylinder 31 consists of only one part and has at its lower end a soft sealing ring 32. This soft sealing ring 32 is formed conical, diverging to correspond to the conically converging or decreasing lower part 33 of the cap 17 for sealing against the cap 17 which is fixed to the upper part 3 of the housing, as can be seen from the closed position shown in Fig. 2. Thereby there results also a gas-tight connection of the closing cylinder 31 with the cap 17 as well as the packing 4 in the closed state, this being continually repeated, under the action of the pressure of the closing sleeve or cylinder 31 against the sealing ring 4.

The sealing pressure is there produced by a pressure spring 34 acting against the sealing ring-channel packing 4. The sealing ring packing 4 can be easily replaced by lifting the upper part 3 of the housing top after loosening the screws 5. In this manner also, the sealing mass 16 Fig. 1, or 32 Fig. 2, lying against the wall of the cap 17 can be renewed.

With the constructional form shown in Fig. 3 the housing 1, preferably formed tubular in the central part, is reduced radially gradually upwards to the filling pipe 20 and also below, down to the funnel-shaped outlet part 2. The ring channel for the inlet to the upper part 37 comprises flange 35 of an outer cylindrical wall 38, attached to the upper part 37 which is radially reduced upwards, combined with a top flange 36 to which again is attached the flange 39 of the filling pipe 20 providing a packing channel opening downstream of the inlet to housing 1.

Between an inner ring-shaped collar 47 combined with the top flange 36 and the outer wall 38, the packing 4, consisting of soft material for example asbestos, is carried on the flat bottom ring 9 connected with the outer wall 38. Between the flat bottom ring 9 and the inner collar 47 there is left free a ring space for the entrance engagement of the closing sleeve or cylinder 11 to engage the packing 4. Above the soft packing 4 there is carried, as in Fig. 1, a vertically displaceable flat top ring 8 which presses directly against the packing mass 4 by means of screws 7 arranged in the top flange 36.

By means of connecting vane plates 19 there is connected to the inner collar 47 a cap 44 which is conical at its top but elsewhere is formed cylindrical forming a bearing for sleeve 11. The tubular cap 44, by means of a packing mass 45, lies against the inner central sleeve or cylinder part 46 of the closing cylinder 11 in such a way that the closing cylinder 11 is displaceable axially in a substantially dust-tight manner with the rear bearing part of cap 44. The lower part 46 of the closing cylinder 11 dips into a water cup 40 which is formed by the lower cylindrical wall of the fixed cap 44 and a surrounding tubular wall 49 connected with the cap 44 by an upper flat ring 48 at the lower part of cap 44. By means of a lower flat ring 50 connected with the lower end of the wall of the fixed tubular cap 44, a further outer tubular wall 51 is connected at a distance outside the pipe 49 and projecting upwards somewhat above the pipe 49.

Sealing liquid is supplied to the water cup 40 through pipe connections 52, which are connected with a ring pipe 53. The ring pipe 53 is connected to a feed pipe 54. The sealing liquid flows in continuously under pressure and over the upper end of the pipe 49 to the water cup and to the intermediate space between the pipe 49 and the pipe 51 and thence into the free space between two bottom rings 48, 50, and away. This bottom free space is connected with pipe connections 55 which are connected to a ring pipe 56 which is connected with a waste pipe 57.

A piston cylinder 58 is fixed to the upper part of the fixed tubular cap 44. In the piston cylinder 58 is displaceably carried a piston 59, the piston rod 60 of which passes through a stuffing box 61 of the piston cylinder 58 and is fixed below to an outer tubular part 63 of the closing cylinder 11 by means of a cross head 62. The tubular part 63 surrounds the water cup 40 and is fixed above to the inner dip pipe 46 of the closing cylinder 11.

Attached to the lower part of piston cylinder 58 is a pipe 64, and a pipe 65 above. By these pipes 64, 65 the pressure medium is introduced for actuation of the piston 59. The pipes 54, 57 and 64, 65 pass through a pipe connection 66 of the housing 1. The pipe connection 66 is closed off by a flange 67 through which the pipe connections 54, 57, 64, 65 pass gas-tight.

The housing 1 is surrounded by a double walled jacket 68 to which cooling liquid is supplied at the bottom through the pipe 69 and led away at the top through the pipe 70.

The housing 1 consists of an upper and a lower part connected together by flanges 71. The cooling liquid can flow through the flanges by borings 72 of the flanges 71. It is however also possible to provide both parts of the housing with cooling water connections.

To the lower funnel-shaped part 2 of the housing 1 pipe 73 is attached by means of flanges 74. The pipe 73 is provided with a water cup 75 similar to the water cup 40 for the upper closing cylinder 11. In this case the water cup 75 is formed of a pipe part 76 and a pipe part 77 arranged at a distance inward from it, both being connected with the pipe 73. Barrier liquid is supplied to the water cup 75 through the pipe 92 and led away through the pipe 91. In the water cup 75 a closing cylinder 78 dips which in the closed state is pressed against a soft sealing mass 89. The soft sealing mass 89 lies between the outer wall of a tubular cap 79 and a collar 80 which is fixed to the tubular cap 79 by screws 81. The tubular cap 79 is fixed to the outlet funnel 2 by connecting plates 82. At the lower end of the funnel 2 there is arranged a cap 88 fixed to cylinder 78 having a soft sealing mass 90 which has the task of the sealing mass 45 of the tubular cap 44 and is merely intended to prevent a penetration of dust into the water cup through the space between funnel 2 and cylinder 78.

In a piston cylinder 83 connected with the tubular cap 79 there is carried a piston 84, the piston rod 85 of which is connected with a cross head 86. The cross head 86 is arranged in fixed position to the closing cylinder 78. The pressure medium is supplied to or from the piston cylinder through the pipes 87.

The actuation of the sealing device is carried out in such a way that first the upper closing cylinder 11 opens by means of the piston 59, i. e. is pushed downwards, so that the hot material can slide over the conus at the top of the cap-shaped part 44. The material then lays in the lower funnel 2 of the housing until after the closing of the upper closing cylinder 11, whereupon the lower closing cylinder 78 is opened by means of the pressure piston device 85, so that the material can fall out through the path formed by the inclined plane of funnel 2 and the base of the tubular cap 79 the guide pipe cap 88 fixed to the closing cylinder 78, after which the closing cylinder 78 is closed again and cylinder 11 opened.

I claim:

1. Sealing device for transferring loose material between gas-filled chambers, comprising: a housing having means for attachment to an exterior chamber to be sealed off; a deflector forming an intercommunicating passage interconnecting the chamber interior of the housing with the chamber interior of the exterior chamber; and means for sealing off the material flow path through said intercommunicating passage to the interior of the housing comprising, a packing confining ring channel, a sealing mass of packing confined inside the ring channel, and a closing sleeve reciprocable axially across said path of flow with movement of one end of the sleeve into and out of the interior of the ring channel for pressing engagement with the mass of packing material inside the ring channel, said channel opening into the interior of the housing for reception of said end of the sleeve solely in a direction facing downstream of said intercommunicating passage to be sealed off, said sleeve being retractable relative to said deflector to bring said one end of the sleeve back to at least the plane of said deflector in the axial movement of the sleeve away from the ring channel, to bring said sleeve to a position outside said path of flow through the intercommunicating passage to the interior of said housing, seal means located between the deflector and the sleeve for sealing off the upstream side of said sleeve to flow of material therealong from said passage during the entire reciprocation movements of said sleeve, and actuating means for the sleeve.

2. Sealing device for transferring loose material between gas-filled chambers comprising: a housing having means for attachment to an exterior chamber to be sealed off; a deflector forming an intercommunicating passage interconnecting the chamber interior of the housing with the chamber interior of the exterior chamber; and means for sealing off the material flow path through said intercommunicating passage to the interior of the housing comprising, a packing confining ring channel surrounding said passage, a sealing mass of packing material confined inside the ring channel, said deflector comprising a tubular cap stationarily supported from said channel and providing a conical head in spaced relation to said ring channel and a rearwardly extending tubular cylinder seat member in axially aligned position relative to said intercommunicating passage, and a closing sleeve slidably mounted exteriorly on said tubular cylinder seat member for reciprocation of the forward part of the sleeve through the space between the head and the ring channel with movement of the forward end of the sleeve into and out of the interior of the ring channel for pressing engagement with the mass of packing material inside the ring channel, said channel opening into the interior of the housing for reception of the forward part of the sleeve solely in a direction facing downstream of said intercommunicating passage to be sealed off, said sleeve being retractable in its axial movement away from the ring channel to a position at which its forward terminus is rearwardly of the conical head to leave a clear passage for flow of material down the head to the chamber interior of the housing, a seal between the tubular cylindrical seat member and the sliding sleeve, and actuating means on the interior of the tubular cylindrical seat member with connections to the exteriorly sliding sleeve for reciprocating said sleeve.

3. A sealing device as claimed in claim 2, and in which the sleeve comprises two axially movable telescopic parts with a packing of compressible material therebetween to constitute the aforesaid seal between the tubular cylindrical seat member and the sliding sleeve, each telescopic part having a member in position to exert a thrust on the packing on movement of the telescopic members toward each other to expand the packing radially of the sleeve and its seat as the forward part of the sleeve presses onto the packing in the ring channel.

4. A sealing device as claimed in claim 2 and in which the seal comprises a packing channel with a packing of outwardly diverging interior configuration, and in which the tubular cylindrical seat member comprises an inwardly converging seat for coaction therewith as the forward part of the sleeve presses into the packing material in the ring channel for sealing off the intercommunicating passage.

5. A sealing device as claimed in claim 2, and in which the seal between the sleeve and the tubular cylindrical seat comprises a liquid cup seal in which the sliding sleeve dips during its reciprocation.

6. A sealing device as claimed in claim 2, in which the opening in the ring channel for the reception of the forward part of the sleeve comprises a channel wall with a slit therein.

7. A sealing device as claimed in claim 2, and in which the ring channel comprises a top cover exposed to the exterior of the housing, adjustable screws extending through the cover and accessible from the exterior of the housing for exterior adjustment of the compactness of the packing material within the ring channel, and a flat plate intermediate the portions of screws in the ring channel and the packing material therein.

8. A sealing device as claimed in claim 7, and which includes spring means intermediate the screws and the flat plate.

9. A sealing device as claimed in claim 2 and in which the housing is constituted of a liquid cooled double-walled jacket.

10. A sealing device as claimed in claim 2 and in which the said intercommunicating passage also constitutes an upper inlet passage to the housing, and a lower outlet passage is provided in the housing, which is also sealable by a lower ring channel with packing therein, said channel opening in a direction facing solely downstream of the outlet passage and having a sleeve reciprocable into and out of said opening in the lower ring channel and retractable out of the path of flow of material between the lower ring hcannel and the lower outlet passage, said sleeve extending into said outlet passage and dipping therein in a liquid cup seal, and said sleeve having connections in the outlet passage to actuating means in a shield chamber disposed in the housing interior and forming the walls of the lower ring channel.

References Cited in the file of this patent

UNITED STATES PATENTS

| | | |
|---|---|---|
| 1,483,991 | Slattery | Feb. 19, 1924 |
| 2,010,416 | Schlagenhauff | Aug. 6, 1935 |
| 2,525,799 | Hecker | Oct. 17, 1950 |